US005137708A

United States Patent [19]

Hashimoto et al.

[11] Patent Number: 5,137,708

[45] Date of Patent: Aug. 11, 1992

[54] METHOD OF PRODUCING BROMINE-TREATED GRAPHITE FIBERS

[75] Inventors: Setsujiro Hashimoto; Kiyoshi Yagi; Masahiro Kanda, all of Shizuoka, Japan

[73] Assignee: Yazaki Corporation, Tokyo, Japan

[21] Appl. No.: 581,265

[22] Filed: Sep. 12, 1990

Related U.S. Application Data

[63] Continuation of Ser. No. 218,399, Jul. 13, 1988, abandoned.

[30] Foreign Application Priority Data

Jul. 17, 1987 [JP] Japan ................................ 62-177245

[51] Int. Cl.$^5$ ................................ C01B 31/04

[52] U.S. Cl. ................................ 423/448; 423/449; 423/453; 423/460; 252/502

[58] Field of Search ............... 423/448, 449, 453, 460; 252/502

[56] References Cited

U.S. PATENT DOCUMENTS

| | | | |
|---|---|---|---|
| 3,409,563 | 11/1968 | Olstowski | 423/448 |
| 3,931,392 | 1/1976 | Deitz | 423/460 |
| 4,014,980 | 3/1977 | Fujimaki et al. | 423/448 |
| 4,388,227 | 6/1983 | Kalnin | 252/460 |
| 4,414,142 | 11/1983 | Vogel et al. | 252/560 |
| 4,497,788 | 2/1985 | Bradley et al. | 423/453 |
| 4,572,813 | 2/1986 | Arakawa | 423/448 |
| 4,632,775 | 12/1986 | Kalnin et al. | 252/506 |
| 4,634,546 | 1/1987 | Kalnin et al. | 252/506 |
| 4,749,514 | 6/1988 | Murakami et al. | 423/460 |
| 4,770,867 | 9/1988 | Coulen et al. | 423/453 |

FOREIGN PATENT DOCUMENTS

| | | |
|---|---|---|
| 117622 | 7/1982 | Japan . |
| 54999 | 3/1985 | Japan . |

OTHER PUBLICATIONS

Hodey et al., "The Intercalcation of Bromine in Graphitized Carbon Fibers and Its Removal", Carbon, vol. 16 (1978), pp. 251–257.

Dresselhaus et al., "Intercalation Compounds of Graphite", Advances in Physics, 1981, vol. 30, No. 2, pp. 147–148.

Proceeding of Electrical Society, vol. 98, No. 5, pp. 249–256, 1978.

NASA-Technical Memorandum, 1986, NASA-TM-87 275, E-2 978, NAS. 1.15: 87 275 (Gaier).

*Primary Examiner*—Robert Kunemund
*Attorney, Agent, or Firm*—Nikaido, Marmelstein, Murray & Oram

[57] ABSTRACT

The method of producing bromine-processed graphite fibers, comprises graphitizing gas phase grown carbon fibers by bringing ultrafine particles of metal catalyst and a hydrocarbon compound suspended in a high temperature zone into contact with each other, to obtain graphite fibers having such a crystal structure that carbon hexagonal network face is substantially in parallel with the axes of fibers and is oriented coaxially, and then bringing the thus obtained graphite fibers and bromine at a temperature lower than 60° C. In this case, the interplanar spacing or the lengths of the repeat distance along the c axis direction in the crystals vary with a plurality of values within a range from 10 to 40 Å.

4 Claims, 1 Drawing Sheet

METHOD OF PRODUCING BROMINE-TREATED GRAPHITE FIBERS

This application is a continuation of application Ser. No. 218,399 filed Jul. 13, 1988, now abandoned.

BACKGROUND OF THE INVENTION

1. Field of the Invention

The present invention concerns carbon fibers suitable to be utilized for electroconductive composite materials, etc.

2. Description of the Prior Art

Since carbon fibers are light in weight, excellent in mechanical strength and satisfactory also in electroconductivity, they have been utilized in various application uses such as composite materials in combination with metals, plastics or carbon materials. However, since carbon materials are poor in the electroconductivity as compared with metal materials, various studies have been progressed for improving the electroconductivity of the carbon materials and there have been developed intercalation compounds improved with electroconductivity by inserting various molecules, atoms, ions, etc. between the layers of graphite crystals. By the way, if it is intended to obtain carbon fibers of excellent conductivity by utilizing the techniques of such intercalation compounds, since no great development can be obtained for three-dimensional graphites structure for fibers prepared by carbonizing organic fibers and further graphitizing them, it is difficult to incorporate materials between layers. Then, if the processing conditions for forming the intercalation compounds are made severe, texture of the graphite fibers are destructed to damage the mechanical strength or they are powderized, as well as there has been a problem that the thus obtained intercalation compounds are not stable.

On the other hand, it has been known that graphite fibers low electric resistivity can be obtained by preparing graphite fibers through heat treatment of gas phase grown type carbon fibers at 2800°-3000° C. which are formed by thermal decomposition of benzene-hydrogen gas mixture near 1100° C. and then immersing such graphite fibers in fuming nitric acid at 20° C. for more than 24 hours (Proceeding of Electrical Society, vol. 98, No. 5, p249-256, 1978). However, even such fibers cannot be practical in that nitric acid is split off at high temperature to make the electric resistance instable.

SUMMARY OF THE INVENTION

In view of the above, it is an object of the present invention to provide a method of producing graphite fibers of satisfactory electroconductivity, remarkably excellent in atmospheric stability and heat stability, easy to blend with thermoplastic resin, etc. and suitable to the production of electroconductive composite material, etc.

The foregoing object of the present invention can be attained by producing bromine-treated graphite fibers comprising an intercalation compound of graphite fibers having such a crystal structure that carbon hexagonal network face is substantially in parallel with axes of fibers and oriented in a coaxial manner, and the length of the repeating period along the c axis direction of crystals vary with a plurality of values within the range from 10 to 40 Å, and such bromine-treated graphite fibers are produced by graphitizing gas phase grown carbon fibers obtained by bringing ultrafine metal catalyst particles and a hydrocarbon compound suspended in a high temperature zone into contact with each other, thereby obtaining graphite fibers having a crystal structure in which carbon hexagonal network face is substantially in parallel with axes of fibers and oriented in a coaxial manner and then bringing the graphite fibers and bromine into contact with each other at a temperature lower than 60° C.

DETAILED DESCRIPTION OF THE EMBODIMENTS

Figure 1:
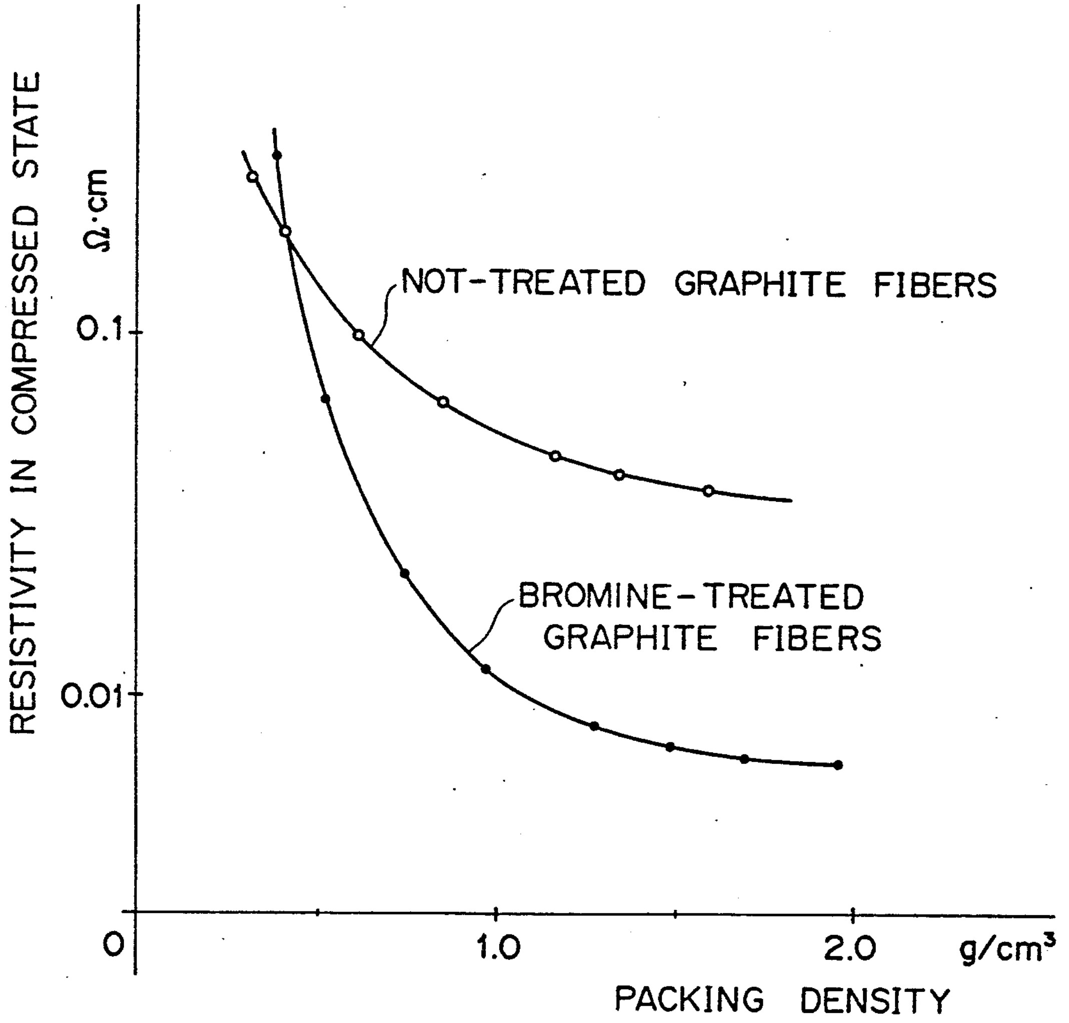
FIG. 1 is a graph showing the relationship between the packing density and an inherent volume resistance of bromine-treated graphite fibers according to the present invention in comparison with that of the not-treated graphite fibers.

The carbon fibers as the material for the bromine-processed graphite fibers according to the present invention can be obtained by using aromatic hydrocarbons such as toluene, benzene and naphthalene, aliphatic hydrocarbons such as propane, ethane and ethylene, preferably, benzene or naphthalene as the starting material, and then bringing such starting material together with a carrier gas such as hydrogen into contact with a catalyst comprising ultrafine metal particles, for example, iron, nickel, iron-nickel alloy, etc. with the grain size from 100 to 300 Å dispersed and suspended in a reaction zone at a temperature from 900° to 1500° C. thereby decomposing them.

The thus obtained carbon fibers are pulverized as required by using a ball mill, rotor speed mill or like other appropriate pulverizer. Although pulverization is not essential in the present invention, it is preferred to conduct since it can improve the feasibility for forming the intercalation compound and the dispersibility upon utilizing them as the composite with other materials.

Further, when the thus obtained carbon fibers are subjected to heat treatment at a temperature from 1500° to 3500° C., preferably, from 2500° to 3000° C., from 10 to 120 min, preferably, from 30 to 60 min in an inert gas atmosphere such as argon, graphite fibers having such a crystal structure that the carbon hexagonal network faces are substantially in parallel with the axes of fibers and oriented in the coaxial manner. In this case, if the temperature for the heat treatment is lower than 1500° C., carbon crystal structure does not grow sufficiently. While on the other hand, there is no particular effect if the temperature exceeds 3500° C., which is not economical. In addition, if the time for heat treatment is shorter than 10 min, the effect of the heat treatment is not sufficient giving remarkable scattering in the degree of development for the crystal structure. While on the other hand, no remarkable improvement can be obtained even if the time exceeds 120 min.

Upon applying bromine processing to the thus obtained graphite fibers, the fibers are brought into contact with bromine at a temperature lower than 60° C. for more than 10 min.

The concentration of bromine used in this case is desirably as high as possible, anhydrous bromine is preferred and uses of bromine at a concentration of 99% or higher is desirable. Bromine may be liquid or vapor upon contact with graphite fibers. In the case of using liquid bromine, the graphite fibers are immersed in liquid bromine, for instance. However, since impurities contained in bromine are also brought into contact with the graphite fibers, it is desirable to avoid such impurities as inhibiting the penetration and diffusion of bromine between graphite crystal layers, or such impurities as enter by themselves between the graphite crystal layers. While on the other hand, in the case of using bromine vapors, similar cares to above have to be taken. However, since non-volatile impurities are eliminated spontaneously, it has a merit of undergoing less restriction with respect to the purity and the state of the generation source of the bromine vapors.

Upon contact of graphite fibers and bromine, the temperature is lower than 60° C., preferably, from 5° to 30° C. If the temperature is too low, diffusion of bromine between the graphite crystal layers requires a long period and, in addition, there is a disadvantage that the temperature control is difficult. While on the other hand, if the temperature is too high, handling of bromine is difficult, fiber destruction tends to occur and, if not destroyed, mechanical strength is deteriorated.

Time of contact between the graphite fibers and bromine should be 10 min or longer, preferably, from 30 min to 72 hours. If the time of contact is shorter than 10 min, no substantial time control is impossible in view of the operation to result in remarkable scattering in the quality, as well as there is scarce economical merit in shortening the time of contact.

The interplanar spacing or the length Ic of the repeat distance period in the direction of c axis in the crystals for the bromine-processed graphite fibers obtained by applying the above-mentioned production conditions can be calculated, for example, by bragg angle of diffraction line (001) obtained by X-ray diffractometry. The bromine-processed graphite fibers with a plurality of values Ic within a range of 10–40 Å obtained by the method according to the present invention have high electroconductivity with less scattering thereof, as well as show satisfactory storage stability in atmosphere and also have excellent heat stability.

EXAMPLE 1

To a tubular vertical electrical furnace controlled to a temperature from 1000° to 1100° C., metal iron catalyst particles with the grain size from 100 to 300 Å are suspended while flowing hydrogen from below, into which a gas mixture of benzene and hydrogen was introduced from below to conduct decomposition, thereby obtaining carbon fibers with 10 to 100 $\mu$m length and 0.1 to 0.5 $\mu$m diameter. Then, the carbon fibers are pulverized by using a planetary gear type ball mill (P-5 type: manufactured by Flitch Japan Co, Ltd.) for 20 min at 500 rpm.

The pulverized carbon fibers were placed in an electrical furnace and then maintained under an argon atmosphere at a temperature of 2960° to 3000° C. for 30 min to obtain graphitization. For the obtained fibers it was confirmed from the X-ray diffractometry and electron microscopic observation that the had a crystal structure in which the carbon hexagonal network faces were in parallel with the axes of fibers and oriented in a coaxial manner, and that they are pulverized to 3-5 $\mu$m length.

The thus obtained graphite fibers were placed by one gram into a 5 cc inner volume vessel, cooled to −20° C. and then bromine cooled in the same manner was also charged into the vessel, which was tightly sealed and then returned to the room temperature. After maintaining at about 23° C. for 24 hours, the content was taken out to evaporize bromine in a flowing air stream and, further, maintained in a desicator charged with sodium thiosulfate and silica gel for two days to eliminate excess bromine.

When the intercalation spacing or the length Ic of the repeat distance along the c axis direction in the crystals was measured by the X-ray diffractometry for the thus obtained bromine-processed graphite fibers, four kind of values within a range from about 18 Å to about 34 Å were obtained. Assuming that the inter-layer distance with no insertion of material between the graphite layers and the inter-layer distance with insertion of bromine as 3.354 and 7.05 Å respectively upon calculation it was found that they were the intercalation compounds with bromine at the number of repeating graphite layer stages of 5 to 9.

The powder of the bromine-processed graphite fibers was charged by 0.5 g into a cylinder of 1 cm diameter made of insulation material, vertically put between electrodes made of brass and supplied with 100 mA of current between the upper and the lower electrodes under compression to determine the relationship between the packing density and the inherent volume resistance of the graphite fibers. In addition, when the same measurement was conducted for those bromine-processed graphite fibers applied with heat treatment at 100° C. for one hour and then left at ambient temperature for one hour and applied with heat treatment at 200° C. for one hour and then left at ambient temperature for one hour, they showed completely identical characteristics.

FIG. 1 shows the results of the measurement conducted similarly for the not-treated graphite fibers and the results described above.

From the result above, the bromine-processed graphite fibers obtained by the process according to the present invention have electroconductivity 5.5 times as high as that of the not-processed graphite fibers and also have extremely excellent heat stability.

EXAMPLE 2

A container incorporating a small amount of bromine and the same graphite fibers as those used in Example 1 were contained in one identical tightly closed vessel and kept at a temperature of 20° C. for 24 hours while maintaining the inside of the vessel a as bromine atmosphere. Then, graphite fibers were taken out and excess bromine was removed in the same manner as in Example 1.

When the density and the inherent volume resistance were measured in the same manner as in Example 1 for the thus obtained fibers, a value of $6.63\times10^{-3}$ Ω.cm at the density of 1.96 g/cm$^3$ was obtained.

Since the bromine-processed graphite fibers according to the present invention have excellent electroconductivity, that is, of about 1/5.5 of the inherent volume resistance as compared with that of the not-processed graphite fibers and are extremely excellent also in the atmospheric stability and heat stability, they are suitable to the utilization for composite material by blending with thermoplastic resins, etc.

The production method according to the present invention has a merit capable of easily producing bromine-processed graphite fibers of high quality and stability, since carbon fibers obtained by fluidizing bed process with high productivity and less scattering in the quality are used.

What is claimed is:

1. A method for producing bromine-processed graphite fibers which comprises graphitizing gas phase grown carbon fibers obtained by contacting a hydrocarbon compound with ultrafine particles of a metal catalyst suspended in a high temperature reaction zone at temperatures of 900° to 1500° C., and the heat treating the reaction product at a temperature of at least 1500° C. to obtain graphite fibers having a crystal structure, said crystal structure having a carbon hexagonal network face substantially parallel with the axes of fibers and oriented in a coaxial manner and then bringing the graphite fibers and a liquid consisting essentially of bromine into contact with each other at a temperature of lower than 60° C., the length of the interplanar spacing along the c axis distance in the crystals of the bromine-processed graphite fibers having a plurality of values within a range from 10 to 40 Å.

2. A method of producing bromine-processed graphite fibers as defined in claim 1, wherein the graphite fibers and said liquid bromine are brought into contact with each other at a temperature of from 5° C. to 30° C.

3. A method of producing bromine-processed graphite fibers as defined in claim 1, wherein the time of contact for the graphite fibers with said liquid bromine is greater than 10 min.

4. A method of producing bromine-processed graphite fibers as defined in claim 1, wherein the time of contact between the graphite fibers and said liquid bromine is from 30 min. to 72 hours.

* * * * *